Patented Oct. 20, 1936

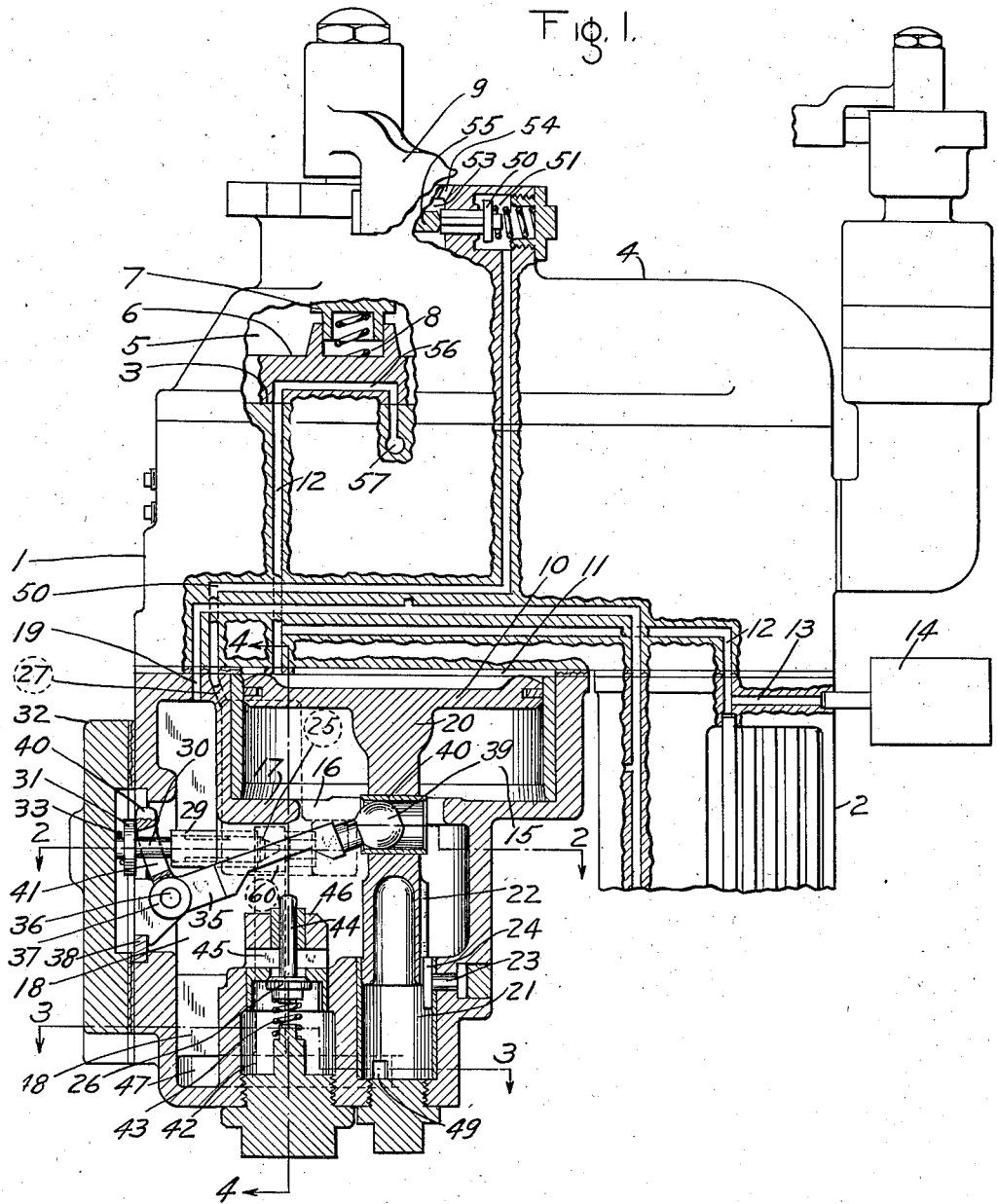

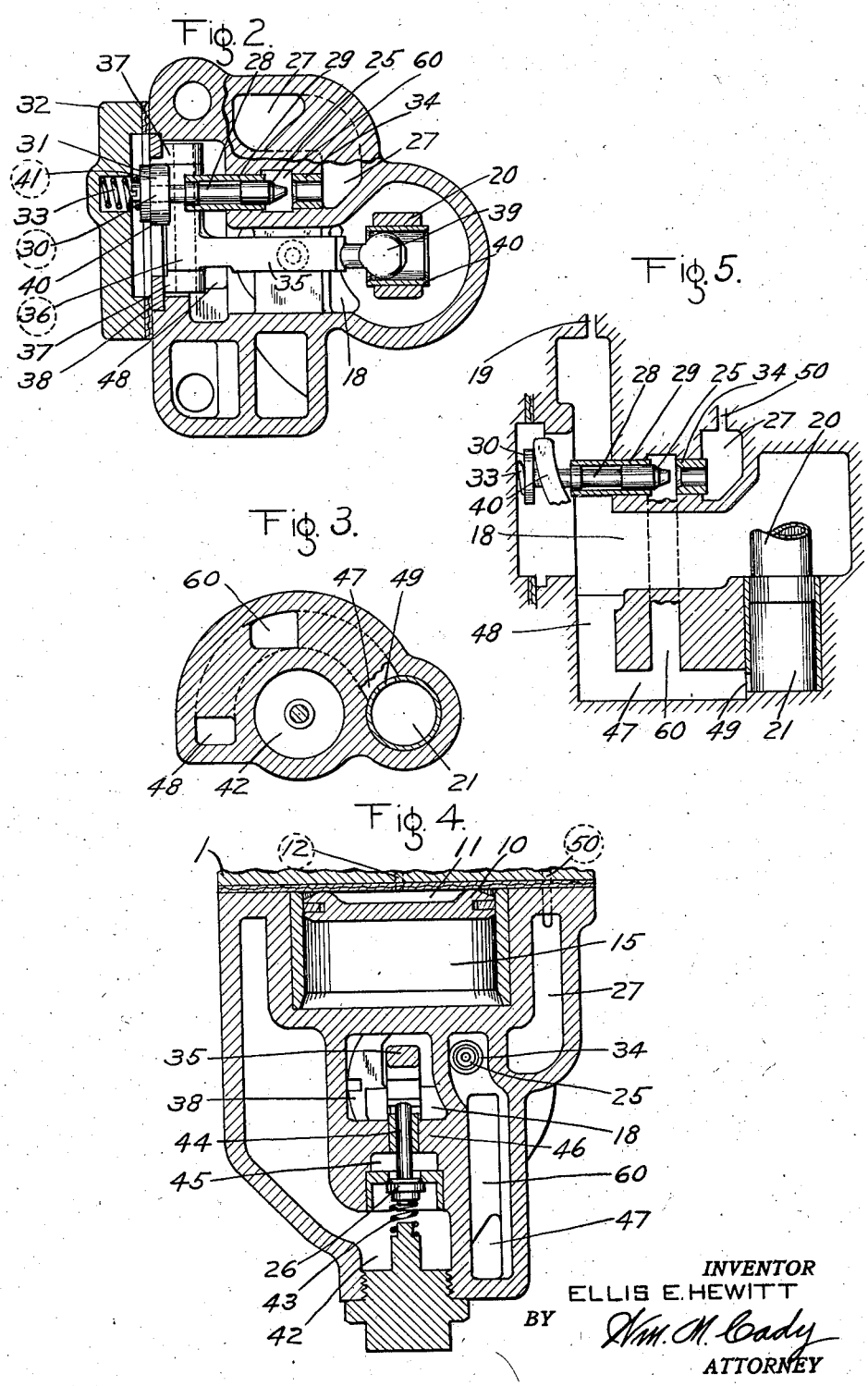

2,058,014

UNITED STATES PATENT OFFICE 2,058,014

FLUID PRESSURE BRAKE

Ellis E. Hewitt, Edgewood, Pa., assignor to The Westinghouse Air Brake Company, Wilmerding, Pa., a corporation of Pennsylvania Application September 22, 1934, Serial No. 745,083

8 Claims. (Cl. 303—88)

This invention relates to fluid pressure brakes and more particularly to brake valve devices for controlling the operation of fluid pressure brakes.

In Patent No. 2,038,168 issued to Clyde C. Farmer on April 21, 1936, there is disclosed a brake valve device of the type which is mounted on a pedestal adapted to be supported by the floor of a locomotive cab or the like. Carried by the pedestal and thereby associated with the brake valve device, is a mechanism which includes a brake pipe discharge valve for venting fluid under pressure from the brake pipe for effecting an application of the brakes, and a brake pipe maintaining valve for supplying fluid under pressure to the brake pipe while an application of the brakes is effected in case there is leakage of fluid under pressure from the brake pipe, so that such leakage will not affect the reduction in brake pipe pressure.

In the above construction, moisture or water which condenses out of the compressed air which passes through the brake valve device, is liable to collect in the chamber containing the brake pipe discharge valve and such a collection of water is liable to cause trouble in service, particularly if the water becomes frozen, because the resulting ice is liable to cause breakage of the parts of the device or complete failure of the device to operate.

The principal object of the invention is to provide means for obviating the above difficulty.

Heretofore, drain cocks have been provided to draw off collected moisture in fluid pressure brake devices, and while a drain cock might be used to eliminate the above difficulty, it is possible, however, that if such drain cocks were not automatic in operation, the above described difficulty might still be encountered and might possibly result in a wreck of a train. According to the invention, the brake valve device is so constructed as to at all times automatically maintain the chamber, in which the brake pipe discharge valve is contained, drained or substantially free of water, so as to eliminate all possibility of the above difficulty.

In the accompanying drawings, Fig. 1 is a side elevation of a portion of a brake valve device with portions of the casing broken away to show the mechanism therein involved in the invention; Figs. 2, 3 and 4 are sectional views of the brake valve device shown in Fig. 1 and taken on the lines 2—2, 3—3, and 4—4, respectively; and Fig. 5 is a diagrammatic view of certain portions of the brake valve device arranged so to clearly show the invention.

As shown in the drawings, the brake valve device comprises the usual body 1 which is mounted on a bracket 2 with a portion overhanging one side of the bracket and which is provided with a rotary valve seat 3. A cover 4 is secured to the body 1 and has a chamber 5 into which the rotary valve seat 3 opens and which contains a rotary valve 6 mounted to rotate on said seat. The usual rotary valve operating stem 7 is provided with one end operatively engaging in a slot 8 provided in the rotary valve 6, while a handle 9 is secured to the other end of said stem outside of the cover 4 for turning said stem and thereby the rotary valve 6.

Secured to the lower face of the portion of the brake valve body 1 which overhangs the bracket 2, is a brake pipe discharge valve and maintaining valve mechanism which comprises a casing containing an equalizing piston 10. A chamber 11 is formed between the upper face of the equalizing piston 10 and the lower face of the brake valve body 1 and is connected to a passage 12 which leads to the rotary valve seat 3 and also to a passage 13 in the pipe bracket 2, the passage 13 being connected to an equalizing reservoir 14.

The equalizing piston 10 has at its lower face a chamber 15 which is open through an aperture 16 in a partition wall 17 to an irregular shaped chamber 18 which in turn is in constant communication with the usual brake pipe (not shown) through a passage 19. The piston 10 is provided with a stem 20 which extends through aperture 16 and chamber 18, the outer end of said stem being mounted to slide in a bore 21 in the casing. A slot 22 is provided lengthwise along the outer portion of the stem 20, and a pin 23, carried by the casing, is provided with a T-head 24 extending into the slot 22 to prevent the piston stem 20 from turning.

The equalizing piston 10 is provided for controlling the operation of a brake pipe discharge valve 25 and a brake pipe maintaining valve 26.

The brake pipe discharge valve 25 is adapted to control the venting of fluid under pressure from a passage 60 and thereby the brake pipe, to a passage 27 and thereby the atmosphere, in effecting a service application of the brakes, as will hereinafter be described more in detail. The brake pipe discharge valve 25 is provided with a stem 28 mounted to slide in a sleeve 29 in the casing. The stem 28 is provided near the outer end with a portion 30 of reduced diameter, while the outer end of said stem is enlarged to form a collar 31, between which and a cover 32 secured to the casing, is disposed a spring 33 adapted to urge the discharge valve 25 into engagement with its seat, which is provided in one end of a sleeve 34 disposed in a wall separating passages 60 and 27.

A bell crank lever having arms 35 and 40 is provided for controlling the operation of the discharge valve 25, said lever being mounted to rock on a pin 36 which is carried by spaced ears or lugs 37 provided on a member 38 which is clamped in a recess in the casing by means of the cover plate 32.

The outer end of the bell crank lever arm 35 is provided with a ball like enlargement 39 disposed to slide and turn in a suitable bore provided in a sleeve 40 which is carried by the equalizing piston stem 20. The bell crank lever arm 40 is offset from the arm 35 to provide operating alignment with the discharge valve stem 28, as shown in Fig. 2 of the drawings. The arm 40 is provided with a through elongated opening 41, through which the discharge valve stem 28 freely extends and of such size as to permit said arm to freely move over the end of the sleeve 29, the arm each side of the opening 41 being adapted to engage the collar 31 on the stem for controlling the operation of the discharge valve 25. The surface of the arm 40 which engages collar 31 is rounded in shape to provide correct unseating of the discharge valve 25 according to the degree of movement of the equalizing piston 10, which operation will hereinafter be more fully described.

The maintaining valve 26 is provided to supply fluid under pressure to the brake pipe through passage 19 at a rate corresponding to the rate of leakage of fluid under pressure from the brake pipe, in case of such leakage, when a service application of the brakes is being effected, so that such leakage will not act to increase the rate of reduction in brake pipe pressure over a service rate of reduction in equalizing reservoir pressure in chamber 11.

The maintaining valve 26 is contained in a chamber 42 which may be connected to any suitable source of fluid under pressure, such as a main reservoir (not shown). A spring 43 is provided in chamber 42 and acts on the valve 26, urging said valve to its seat, while said valve is provided with a stem 44 which extends through an opening 45 in the casing and a bore provided in a wall 46 into operating alignment with the lower face of the bell crank lever arm 35, the stem 44 being of such length that when the equalizing piston 10 is in its normal position permitting spring 33 to seat the discharge valve 25, there will be slight clearance between the end of stem 44 and the bell crank lever arm 35.

According to the invention, passage 60, which leads to the brake pipe discharge valve 25, is connected to a semi-circular passage 47 in the bottom of the casing surrounding the maintaining valve chamber 42. The passage 47 leads in one direction to a vertical passage 48 which opens into chamber 18 through the bottom wall of or at the lowest level of said chamber, and leads in the opposite direction to a passage 49 which opens into chamber 21 below the end of the equalizing piston stem 20. By this construction any water which may become deposited in chamber 18 will drain through passage 48 into passage 47, while in case water from chamber 18 should pass the equalizing piston stem 20 into chamber 21, such water is permitted to flow out of said chamber into passage 47 by way of passage 49. The opening from chamber 21 below the equalizing piston stem 20 through passages 49, 47 and 48 to chamber 18 also prevents a dash-pot effect below the piston stem 20.

Passage 27, to which fluid under pressure is adapted to be exhausted past the brake pipe discharge valve 25, is connected to a passage 50 in the brake valve body 1 and extends through said body and the cover 4 to a chamber 51. A valve 52 is contained in chamber 51 for controlling communication therefrom to a chamber 53 which is open to the atmosphere through a passage 54. A member 55 is provided in the brake valve device for unseating valve 52 when the brake valve handle 19 is in the position for effecting operation of the equalizing piston 10 and thereby the brake pipe discharge valve 25 and maintaining valve 26 to provide a reduction in brake pipe pressure.

The operation of the brake valve device is the same as that of the brake valve device disclosed in the aforementioned patent and it is, therefore, not believed necessary to describe such operation herein, except in so far as required to a clear understanding of the invention.

When the brake valve device is in the normal or running position, in which brakes are adapted to be released and a train charged, the equalizing piston chamber 11, the equalizing reservoir 14 which is connected to said chamber through passages 13 and 12, and the chamber 18 below the equalizing piston 10 are all charged with fluid at the pressure carried in the brake pipe (not shown). In order to effect a service application of the brakes, the brake valve handle 9 and thereby the rotary valve 6 are turned to the position shown in Fig. 1 of the drawings. In this position the supply of fluid under pressure to the equalizing piston chamber 11 and connected equalizing reservoir 14 is cut off and fluid under pressure is vented from said chamber and reservoir through passage 12, cavity 56 in rotary valve 6 and from thence to the atmosphere through the usual exhaust passage 57.

In case the brake pipe is air tight, or even if there is leakage from the brake pipe, but the rate of such leakage is insufficient to reduce brake pipe pressure in chambers 15 and 18 as fast as equalizing reservoir pressure is being reduced in chamber 11, then when the pressure in chamber 11 becomes reduced sufficiently below the brake pipe pressure in chamber 15, the equalizing piston 10 is moved upwardly and acts to turn the bell crank lever in a counterclockwise direction, which pulls the discharge valve 25 from its seat against the opposing pressure of spring 33.

With the discharge valve 25 unseated, fluid under pressure is vented from the brake pipe through passage 19, chamber 18, passages 48, 47 and 60, past the discharge valve 25 to passage 27 and from thence through passage 50, chamber 51, past the unseated valve 52 to chamber 53 and from thence to the atmosphere through passage 54.

In case the rate of leakage from the brake pipe and, therefore, from chambers 15 and 18 is such as to reduce the pressure in said chambers faster than the pressure is reduced in chamber 11 above the equalizing piston 10 then said piston is moved downwardly and turns the bell crank lever in a clockwise direction. The bell crank lever arm 35 is thereby turned into engagement with the maintaining valve stem 44 and upon further movement acts to unseat the maintaining valve 26 an amount sufficient to permit flow of fluid from chamber 42 to chambers 15 and 18 and from thence to brake pipe at such a rate as to maintain the pressure in said chambers and brake pipe substantially equal to the pressure acting in the equalizing piston chamber 11. It will now be evident that in effecting an application of the brakes, the rate of reduction in brake pipe pressure is controlled so as not to exceed the usual service rate of reduction in pressure in the equalizing reservoir 14 and equalizing piston chamber 11, in the same manner as described in connection with the brake valve device disclosed in the aforementioned patent.

It is well known that moisture suspended in the fluid under pressure used in fluid pressure brake systems, is carried throughout the system and deposited in the form of water, and in effecting a service application of the brakes such water may be carried into chamber 18 of the brake valve device along with the fluid under pressure from the brake pipe which flows through said chamber and past the discharge valve 25 to the atmosphere. When the maintaining valve 26 is unseated to supply fluid under pressure to the brake pipe, water, which may have collected in the passage leading to the maintaining valve chamber 42, may be blown past said valve into chamber 18. It is undesirable to permit such water to remain in chamber 18, since in case of freezing, the parts of the device might become damaged in the act of operation or might not even operate at all to effect an application of the brakes, which might result in a wreck.

According to the invention, the apparatus is so arranged that any moisture which may tend to collect in chamber 18 is blown to the atmosphere each time the brake pipe discharge valve 25 is unseated, as will now be described.

It will be noted upon an inspection of the drawings, and particularly Fig. 5, which shows in diagrammatic form the parts of the brake valve device particularly involved in the invention, that chamber 18 is so formed and disposed that any water which may become deposited therein runs by gravity down passage 48 into passage 47, or in case water leaks past the piston stem 20 into chamber 21, such water is permitted to flow out through the passage 49 into passage 47. All flow of fluid under pressure from the brake pipe past the discharge valve 25 to the atmosphere occurs through passage 47 and from thence through the vertical passage 60, so that in case any water collects in passage 47, it is picked up or brushed along by the fluid under pressure rushing through said passages and past the discharge valve 25, and this maintains said passages and the chamber 18 substantially free of water at all times.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A valve device comprising a casing having a chamber and a passage connected to said chamber and disposed to permit drainage of liquid from said chamber into said passage by gravity, and a valve disposed at a level to prevent water collecting at said valve and operative to vent fluid under pressure from said chamber through said passage.

2. A valve device comprising a casing having a chamber and a passage having one end connected to said chamber such that liquid will drain by gravity from said chamber into said passage, the other end of said passage terminating at a level above the lowest level of said chamber, and a valve, disposed at said other end of said passage to prevent liquid in said passage collecting at said valve, operative to vent fluid under pressure from said chamber through said passage.

3. A valve device comprising a casing having a chamber and a passage opening into said chamber through which fluid under pressure is adapted to be vented from said chamber, and a valve operative to open and close communication through said passage, said passage being open to said chamber at the lowest level thereof so that when said communication is open fluid vented from said chamber will flow through the lowest portion thereof and remove liquid from said chamber and said valve being located to prevent liquid collecting in said passage from contacting said valve.

4. A brake valve device comprising a casing having a chamber adapted to be in constant communication with the brake pipe of a train and through which fluid is adapted to be vented from the brake pipe in effecting an application of the brakes, a passage open to said chamber through which fluid under pressure is adapted to be vented from said chamber, said passage being disposed to permit drainage of liquid from said chamber into said passage, a brake pipe discharge valve mounted in said casing above the connection of said passage to said chamber and operative to control venting communication through said passage, and a movable abutment for operating said discharge valve to open said communication.

5. A brake valve device comprising a casing having a chamber adapted to be in constant communication with the brake pipe of a train and through which fluid is adapted to be vented from the brake pipe in effecting an application of the brakes, a brake pipe discharge valve operative to open a communication through which fluid under pressure is adapted to be vented from said brake pipe by way of said chamber, the venting communication from said chamber opening into said chamber at a level to permit drainage of liquid from said chamber into said communication so that the flow of fluid under pressure from the brake pipe through said venting communication will maintain said chamber free of liquid.

6. In a brake valve device, the combination with a casing having a chamber open at all times to said brake pipe, an equalizing piston mounted to work vertically in said casing and open at one side to said chamber, a brake pipe discharge valve mounted to work horizontally in said casing and adapted to control a communication through which fluid under pressure is adapted to be vented from said chamber and thereby said brake pipe, a bell crank lever having one arm operatively connected to said piston and the other arm operatively connected to said discharge valve, said lever being operative by said piston to unseat said discharge valve for venting fluid under pressure from said chamber through said communication, one end of said communication being open to said chamber at a level to permit drainage of liquid from said chamber into said communication.

7. In a brake valve device, the combination with a casing having a chamber adapted to be in constant communication with the brake pipe, an equalizing piston mounted to work vertically in said casing and open at one side to said chamber, a stem on said piston mounted to slide in a bore provided in a portion of said casing below said chamber, said casing having a passage open at one end to the bottom of said bore and at the other end to a communication opening into said chamber at a level to permit drainage of liquid from said chamber into said passage, a conduit open at one end to said passage through which conduit fluid under pressure is adapted to be vented from said chamber and thereby said brake pipe, a brake pipe discharge valve arranged to work horizontally for opening and closing venting communication through said conduit, and a bell crank lever operatively mounted in said chamber and connected to said piston and brake pipe discharge valve whereby movement of said piston is adapted to operate said discharge valve to open communication through said conduit.

8. In a fluid pressure brake, the combination with a bracket, of a brake valve device mounted on said bracket so that a portion of said brake valve device overhangs one side of said bracket, and a combined brake pipe discharge valve and brake pipe maintaining valve device carried by the lower face of the overhanging portion of said brake valve device, said combined device comprising a casing containing an equalizing piston mounted to work vertically and subject on one side to brake pipe pressure, an equalizing reservoir in constant communication with the other side of said piston, said brake valve device having a position for venting fluid under pressure from said equalizing reservoir and thereby the last mentioned side of said piston, a brake pipe discharge valve mounted in said casing to work horizontally for venting fluid under pressure from said chamber and thereby said brake pipe, a maintaining valve mounted to work vertically in said casing for supplying fluid under pressure to said chamber and thereby said brake pipe, and a bell crank lever pivotally connected to said casing and having one arm operatively connected to said piston and arranged in operating alignment with said maintaining valve for unseating same in case, due to leakage, brake pipe pressure on one side of said piston reduces more rapidly than equalizing reservoir pressure is reduced on the other side of said piston, said bell crank lever having another arm operative to unseat said brake pipe discharge valve in case equalizing reservoir pressure on one side of said piston reduces more rapidly than brake pipe pressure on the opposite side of said piston reduces, the communication through which fluid under pressure is adapted to be vented from said chamber by the operation of said discharge valve being open to said chamber at such a level as to permit drainage of liquid from said chamber.

ELLIS E. HEWITT.